(12) United States Patent
Pretty

(10) Patent No.: US 10,364,704 B1
(45) Date of Patent: Jul. 30, 2019

(54) POSITIONING BODIES RELATIVE TO ONE ANOTHER USING SPRING ELEMENT(S) AND AN ELASTOMERIC BODY

(71) Applicant: Rohr, Inc., Chula Vista, CA (US)

(72) Inventor: Michael Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 15/940,154

(22) Filed: Mar. 29, 2018

(51) Int. Cl.
*F16D 25/04* (2006.01)
*F01D 25/04* (2006.01)
*F16M 13/02* (2006.01)
*F16F 3/10* (2006.01)
*F01D 25/28* (2006.01)

(52) U.S. Cl.
CPC .............. *F01D 25/04* (2013.01); *F01D 25/28* (2013.01); *F16F 3/10* (2013.01); *F16M 13/02* (2013.01); *F05D 2220/323* (2013.01); *F05D 2240/90* (2013.01)

(58) Field of Classification Search
CPC ......... F01D 25/04; F01D 25/28; F16M 13/02; F16F 3/10; F05D 2220/323; F05D 2240/90
USPC .......... 248/68.1, 74.2, 634; 267/7, 192, 193, 267/227, 229, 239, 244, 246, 32, 46, 160
See application file for complete search history.

(56) References Cited

U.S. PATENT DOCUMENTS

| | | | | | |
|---|---|---|---|---|---|
| 2,813,692 | A | * | 11/1957 | Peterson | H01B 17/306 174/152 R |
| 6,053,456 | A | * | 4/2000 | Dispenza | F16L 5/10 248/56 |
| 6,466,728 | B1 | * | 10/2002 | Radloff | G02B 6/266 385/134 |
| 8,590,285 | B2 | * | 11/2013 | Hohmann | F23Q 3/008 248/226.12 |
| 9,770,956 | B2 | * | 9/2017 | Dilworth | B60G 11/113 |
| 2013/0233612 | A1 | * | 9/2013 | Pimentel | H02G 15/007 174/545 |
| 2015/0214709 | A1 | * | 7/2015 | Landry | H02G 3/32 248/74.2 |
| 2016/0149386 | A1 | * | 5/2016 | Stechmann | H02G 3/32 248/68.1 |

FOREIGN PATENT DOCUMENTS

| EP | 3037706 | 6/2016 |
|---|---|---|
| WO | 9851953 | 11/1998 |

* cited by examiner

*Primary Examiner* — Muhammad Ijaz
(74) *Attorney, Agent, or Firm* — O'Shea Getz P.C.

(57) ABSTRACT

A system is provided that includes an assembly adapted to support a first body relative to a second body. An elastomeric body is configured with a mounting aperture for receiving the first body. The elastomeric body includes a first protrusion and a second protrusion. A frame wraps about a perimeter of the elastomeric body. The frame is configured with a first window and a second window. The first protrusion extends through the first window to a distal end of the first protrusion. The second protrusion extends through the second window to a distal end of the second protrusion. Spring elements are adapted to mount to the second body. The elastomeric body is disposed between the first and the second spring elements such that the first spring element engages the distal end of the first protrusion and the second spring element engages the distal end of the second protrusion.

19 Claims, 7 Drawing Sheets

POSITIONING BODIES RELATIVE TO ONE ANOTHER USING SPRING ELEMENT(S) AND AN ELASTOMERIC BODY

BACKGROUND

1. Technical Field

This disclosure relates to an assembly for supporting, mounting and/or otherwise positioning a plurality of bodies relative to one another particularly for, but not limited to, aircraft applications.

2. Background Information

Supporting and mounting a plurality of bodies relative to one another, particularly in aircraft applications as well as other potentially high vibration applications, may require compliant support/mounting assemblies. Such support/mounting assemblies may enable a degree of relative movement between the bodies to accommodate vibrations and other movements between the bodies. Various types and configurations of support/mounting assemblies are known in the art. Whiles these known assemblies have various advantages, there is still room in the art for improvement.

SUMMARY OF THE DISCLOSURE

According to an aspect of the present disclosure, a system is provided that includes an assembly adapted to support a first body relative to a second body. This assembly includes an elastomeric body, a frame and first and second spring elements. The elastomeric body is configured with a mounting aperture for receiving the first body. The elastomeric body includes a first protrusion and a second protrusion. The frame wraps about a perimeter of the elastomeric body. The frame is configured with a first window and a second window. The first protrusion extends through the first window to a distal end of the first protrusion. The second protrusion extends through the second window to a distal end of the second protrusion. The first spring element and the second spring element are adapted to mount to the second body. The elastomeric body is disposed between the first and the second spring elements such that the first spring element engages the distal end of the first protrusion and the second spring element engages the distal end of the second protrusion.

According to another aspect of the present disclosure, an aircraft system is provided that includes a first body of the aircraft system, a second body of the aircraft system and an assembly that flexibly supports the first body relative to the second body. The assembly includes an elastomeric body and a plurality of cantilevered leaf springs. Each of the cantilevered leaf springs is attached to the second body. The elastomeric body is disposed between the cantilevered leaf springs such that each of the cantilevered leaf springs slidably contacts the elastomeric body. The first body is attached to the elastomeric body.

According to still another aspect of the present disclosure, a system is provided that includes an assembly configured to flexibly support a first body relative to a second body. The assembly includes an elastomeric body, a frame and a plurality of cantilevered leaf springs. The elastomeric body is configured with a mounting aperture for receiving the first body. The elastomeric body includes a first surface and a second surface. The rigid frame is attached to and supports the elastomeric body. Each of the cantilevered leaf springs is configured to attach to the second body. The elastomeric body is disposed between the cantilevered leaf springs such that a first of the cantilevered leaf springs slidably contacts the first surface and a second of the cantilevered leaf springs slidably contacts the second surface.

The elastomeric body may be configured as an elastomeric block.

The assembly may be adapted to support a third body relative to the second body. The elastomeric body may be configured with a second mounting aperture for receiving the third body.

The frame may be configured from or otherwise include metal.

The frame may not contact the first spring element nor the second spring element.

The first protrusion may be adapted to slide against the first spring element. The second protrusion may be adapted to slide against the second spring element.

The first and the second spring elements may each be configured as or otherwise include a cantilevered leaf spring.

The first and the second spring elements each be configured from or otherwise include metal.

The system may include the first body and the second body.

The first body and the second body may each be configured as components of an aircraft system.

The first body may be configured as or otherwise include a utility line. The second body may be configured as or otherwise include a nacelle structure.

The first body may project through the elastomeric body.

The aircraft system may include a frame configured with a first window and a second window. A first portion of the elastomeric body may project through the first window to a first surface of the elastomeric body. A second portion of the elastomeric body may project through the second window to a second surface of the elastomeric body. A first of the cantilevered leaf springs may slidably contact the first surface. A second of the cantilevered leaf springs may slidably contact the second surface.

The first body may be configured as or otherwise include a utility line. The second body may be configured as or otherwise include a housing.

The frame may wrap about a perimeter of the elastomeric body.

The elastomeric body may include a first protrusion and a second protrusion. The frame may be configured with a first window and a second window. The first protrusion may extend through the first window to the first surface. The second protrusion may extend through the second window to the second surface.

The mounting aperture may extend through the elastomeric body.

The frame does not contact the cantilevered leaf springs.

The foregoing features and the operation of the invention will become more apparent in light of the following description and the accompanying drawings.

DETAILED DESCRIPTION

Figure 1:
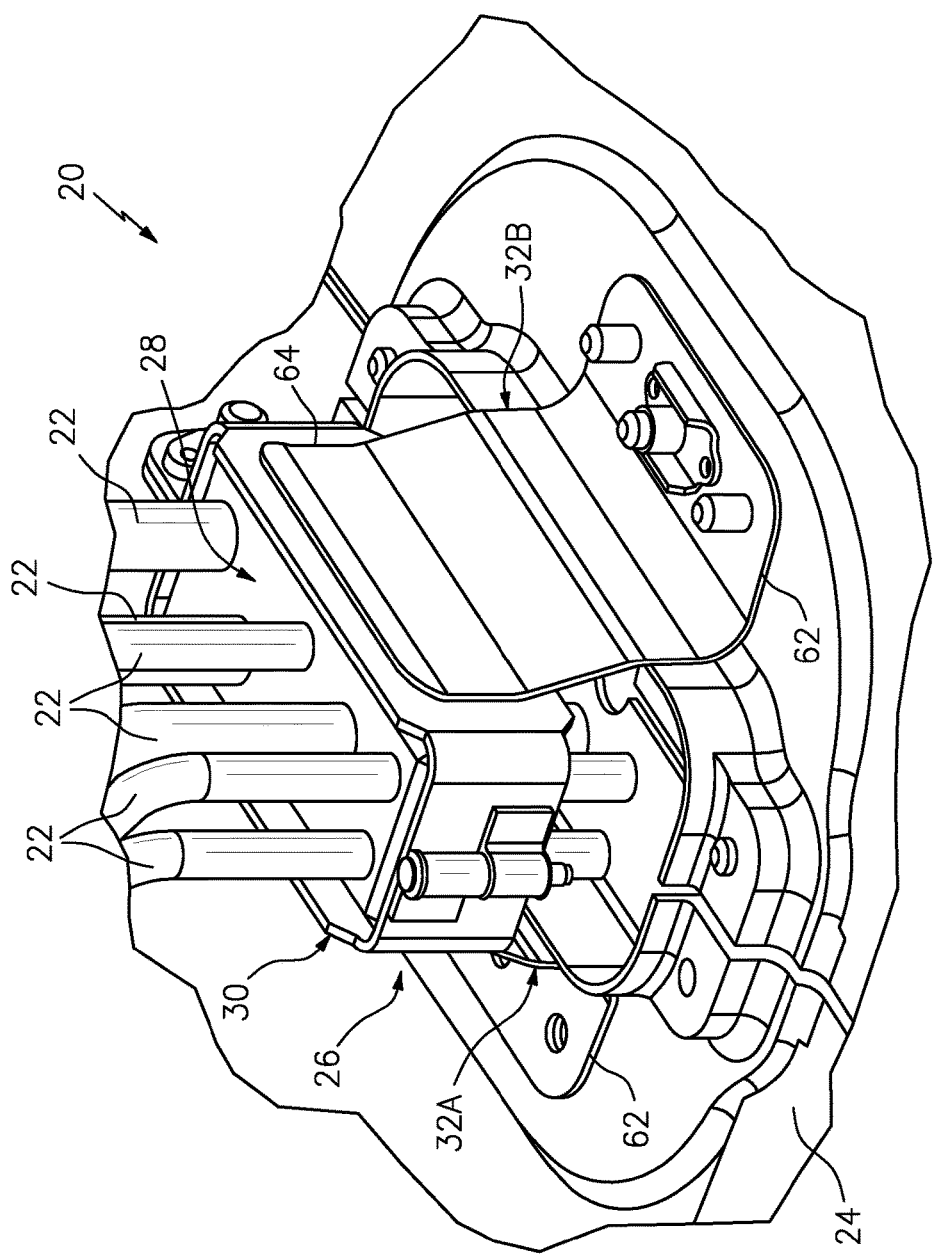
FIG. 1 is a perspective illustration of a portion of an aircraft system, in accordance with various embodiments.

FIG. 1 illustrates a portion of an aircraft system 20. This aircraft system 20 includes one or more first bodies 22, a second body 24 and an assembly 26 for supporting, mounting and/or otherwise positioning the first bodies 22 relative to the second body 24. In the exemplary embodiment of FIG. 1, each first body 22 is configured as a utility line and the second body 24 is configured as a fixed structure such as a housing. Examples of a utility line include, but are not limited to, a fluid conduit (e.g., a drain pipe) and an electrical conduit. An example of a housing is a nacelle structure such as a cowling. The present disclosure, however, is not limited to such exemplary first and second bodies nor to positioning bodies relative to one another in aircraft applications.

Figure 2:
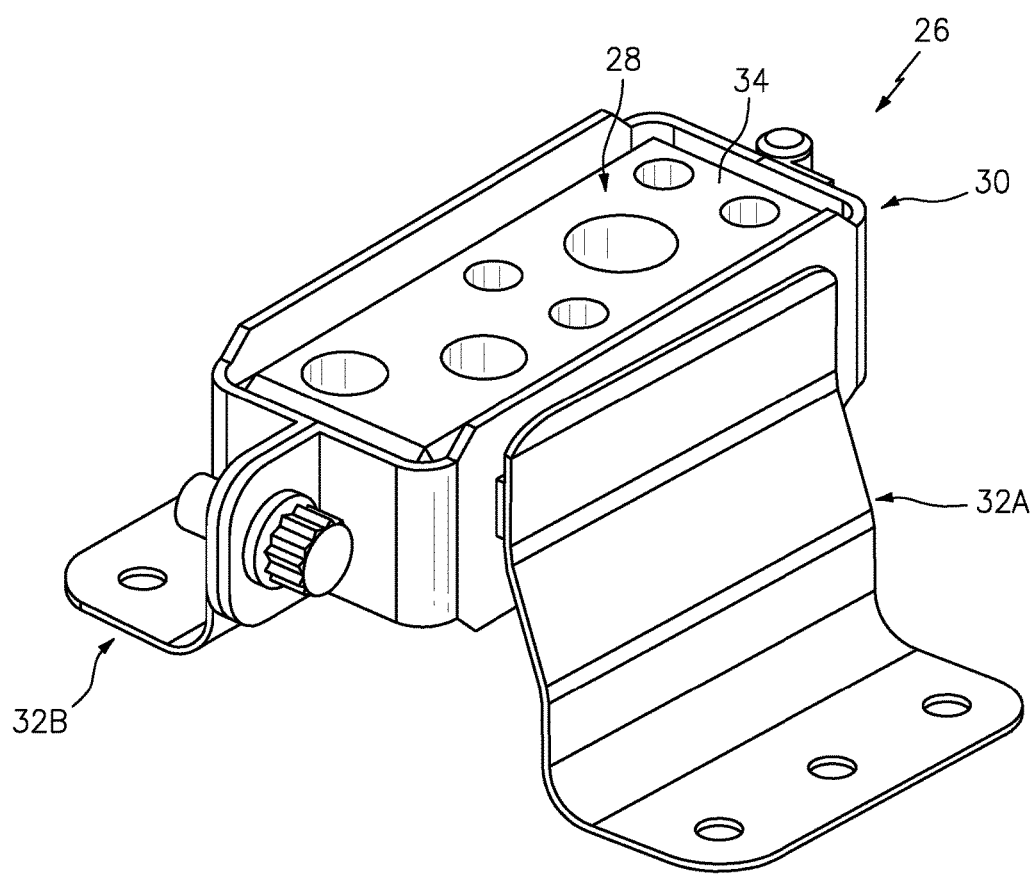
FIG. 2 is a perspective illustration of an assembly for positioning bodies relative to one another, in accordance with various embodiments.
Figure 3:
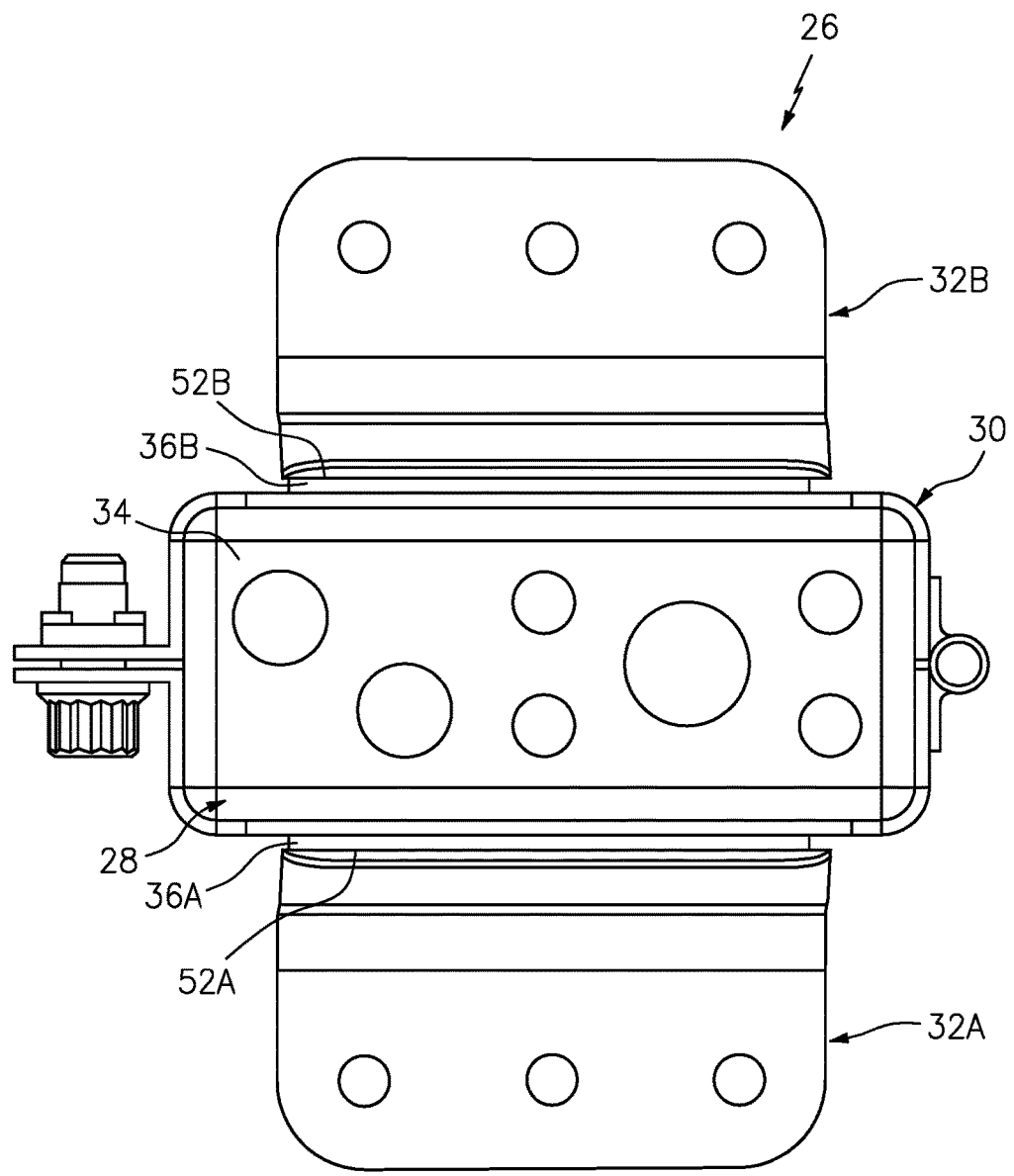
FIG. 3 is a top view illustration of the assembly, in accordance with various embodiments.
Figure 4:
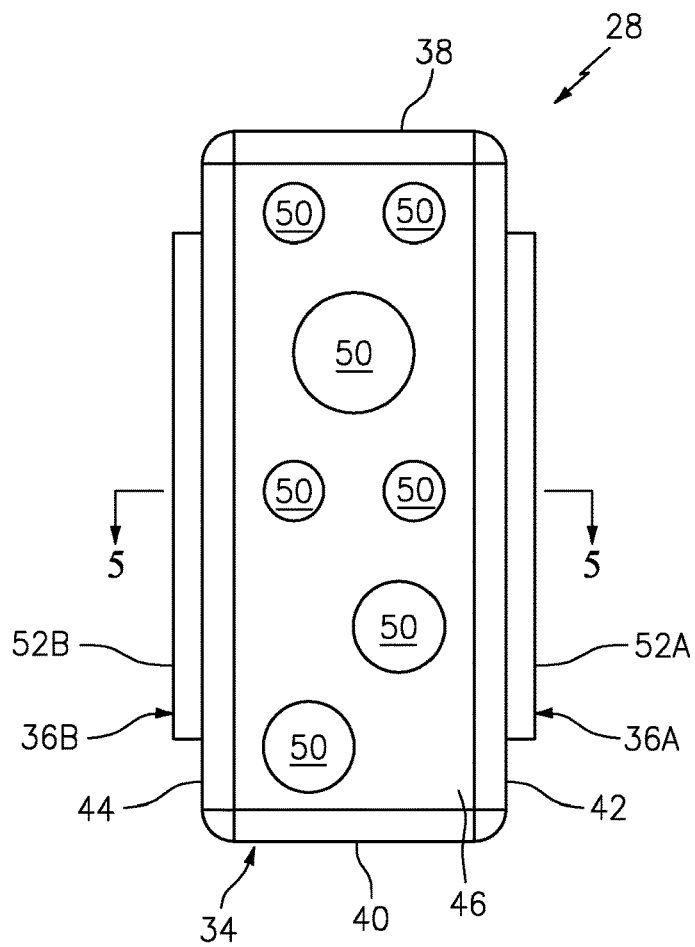
FIG. 4 is a top view illustration of an elastomeric body for the assembly, in accordance with various embodiments.
Figure 5:
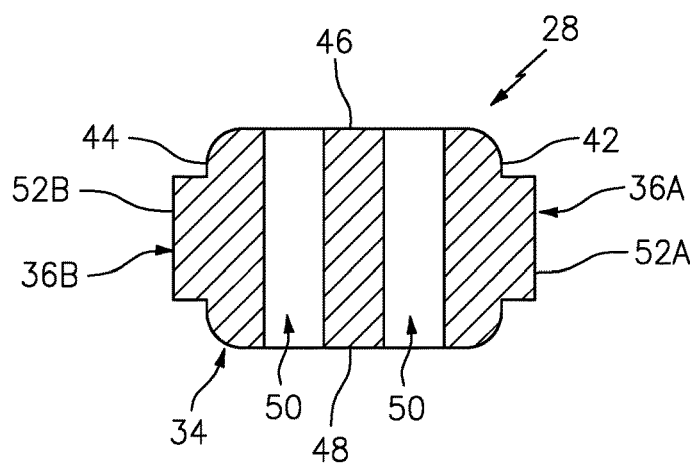
FIG. 5 is a cross-sectional illustration of the elastomeric body for FIG. 4, in accordance with various embodiments.

The assembly 26 of FIGS. 2 and 3 includes an elastomeric (e.g., resilient) body 28, a rigid frame 30 and one or more spring elements 32A and 32B (generally referred to as "32"). Referring to FIGS. 4 and 5, the elastomeric body 28 is configured as an elastomeric block (e.g., brick) with one or more spring element landings. The elastomeric body 28 of FIGS. 4 and 5, for example, includes an elastomeric body base 34 and one or more elastomeric body protrusions 36A and 36B (generally referred to as "36"), where each protrusion 36 forms a respective one of the spring element landings.

The base 34 extends longitudinally between a surface 38 at a longitudinal first side of the base 34 and a longitudinally opposing surface 40 at a longitudinal second side of the base 34. The base 34 extends laterally between a surface 42 at a lateral first side of the base 34 and a laterally opposing surface 44 at a lateral second side of the base 34, which surfaces 42 and 44 extend between and may be perpendicular to the surfaces 38 and 40. The base 34 extends vertically between a surface 46 at a vertical first end of the base 34 and a vertically opposing surface 48 at a vertical second end of the base 34, which surfaces 46 and 48 extend between and may be perpendicular to the surfaces 38, 40, 42 and 44.

The base 34 is configured with one or more apertures 50; e.g., through-holes, bores. Each of these apertures 50 is adapted to receive a respective one of the first bodies 22 as shown in FIG. 1. Each of the apertures 50 extends vertically through (or in alternative embodiments partially into) the base 34 between the vertical end surfaces 46 and 48.

The protrusions 36 are arranged on opposing sides of the base 34. The protrusions 36A and 36B of FIGS. 4 and 5, for example, are located on the lateral first and second sides of the base 34. The first protrusion 36A projects laterally outward from the first lateral side surface 42 to a first spring element landing surface 52A at a lateral distal end of the first protrusion 36A. The second protrusion 36B projects laterally outward from the second lateral side surface 44 to a second spring element landing surface 52B at a lateral distal end of the second protrusion 36B. Each protrusion 36 may have a generally rectangular cross-sectional geometry, which is exemplified by the rectangular shape of the surface 52A shown in FIG. 7.

The elastomeric body 28 may be configured as a monolithic, unitary body of elastomeric material such as, but not limited to, rubber. However, in other embodiments, the elastomeric body 28 may be configured from a plurality of discretely formed sections (e.g., halves), which may be arranged together during mating of the elastomeric body 28 with the first bodies 22 for example.

Figure 6:
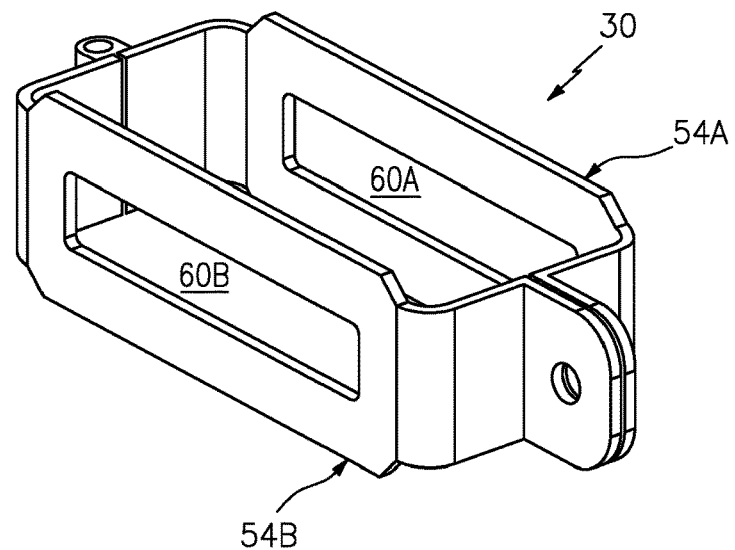
FIG. 6 is a perspective illustration of a frame for the assembly, in accordance with various embodiments.
Figure 7:
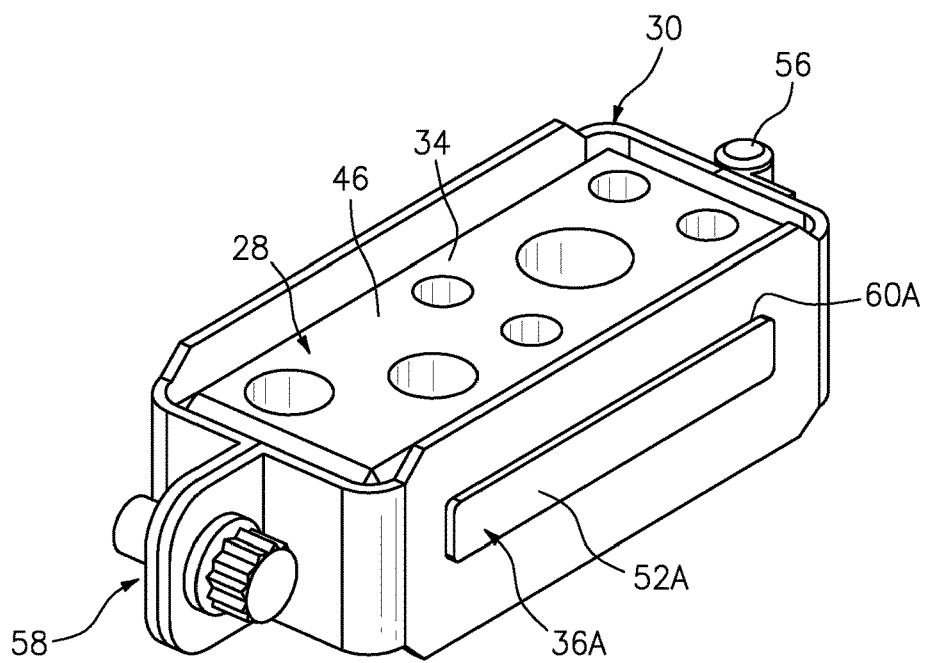
FIG. 7 is a perspective illustration of the frame mated with the elastomeric body, in accordance with various embodiments.
Figure 8:
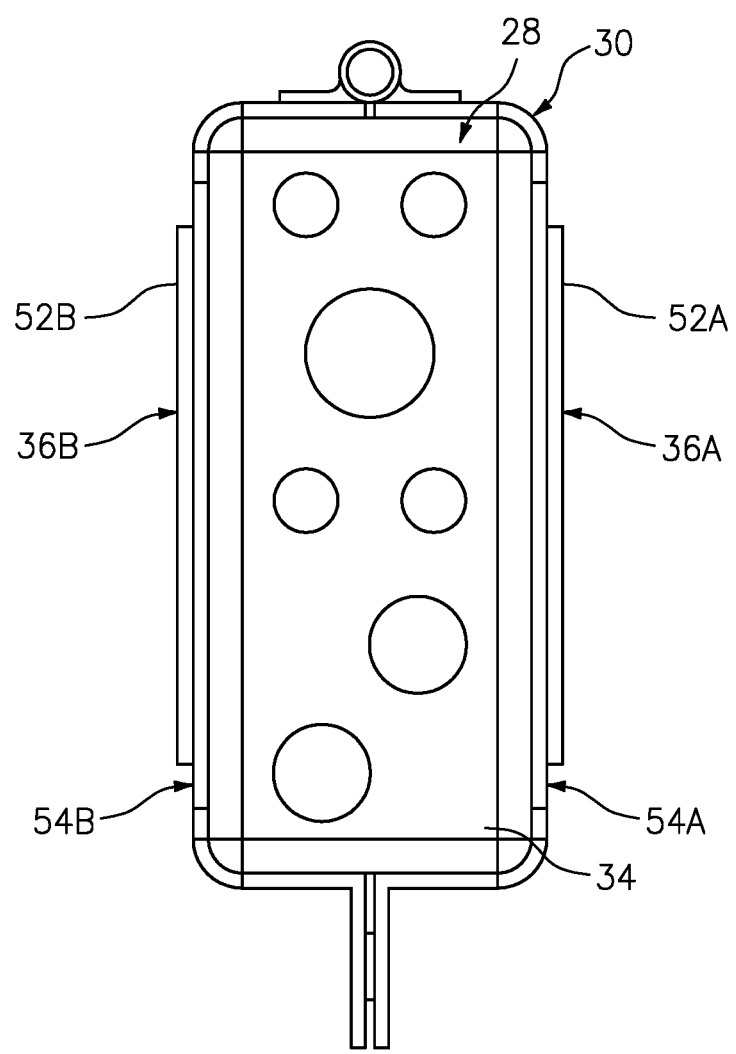
FIG. 8 is a top view illustration of the frame mated with the elastomeric body, in accordance with various embodiments.

Referring to FIG. 6, the frame 30 is configured as a rectangular shaped tubular body, which may wrap partially or completely about a perimeter of and thereby supports the elastomeric body 28 as shown in FIGS. 7 and 8. The exemplary frame 30 of FIG. 6 is configured with a plurality of discrete sections 54A and 54B (generally referred to as "54"); e.g., halves. Referring to FIG. 7, these frame sections 54 are coupled together at one end via a first coupler 56 such as, but not limited to, a hinge pin. This hinge pin enables the frame sections 54 to be opened and closed (pivoted) about an axis of the hinge pin to facilitate mating the frame 30 with the elastomeric body 28 as shown in FIGS. 7 and 8. The frame sections 54 are coupled together at an opposite end via a second coupler 58 such as, but not limited to, a fastener; e.g., a bolt and nut.

Referring to FIGS. 6-8, the frame 30 is configured with one or more windows 60A and 60B (generally referred to as "60"); e.g., through holes. Each of these windows 60 is adapted to receive a respective one of the protrusions 36 when the frame 30 is mated with the elastomeric body 28 (see FIGS. 7 and 8). The first protrusion 36A, for example, projects through the first window 60A and the second protrusion 36B projects through the second window 60B. A lateral length of each protrusions 36A, 36B is greater than a lateral thickness of each respective frame section 54A, 54B. As a result, the spring element landing surfaces 52A and 52B are located outboard of the frame 30.

The frame 30 may be constructed from a rigid material such as, but not limited to, sheet metal.

Figure 9:
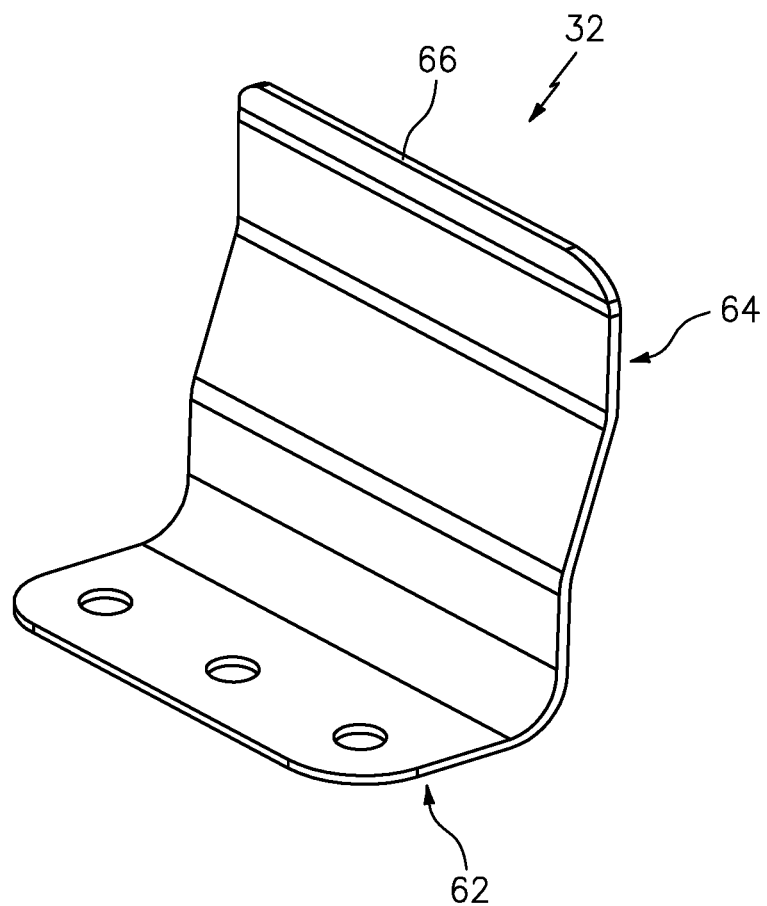
FIG. 9 is a perspective illustration of a spring element, in accordance with various embodiments.

Referring to FIG. 9, each spring element 32 may be configured as a cantilevered leaf spring. Each spring element 32 of FIG. 9, for example, includes a base portion 62 and a cantilevered portion 64. The base portion 62 is adapted to attach to the second body 24 as shown in FIG. 1. The cantilevered portion 64 projects generally vertically out from an end of the base portion 62 to an edge 66 at a distal vertical end of the spring element 32. A longitudinal width of the spring element 32 and each of its portions 62 and 64 is approximately equal to a longitudinal width of a respective one of the spring element landing surfaces 52; in other embodiments however, the spring element 32 may be skinner or wider than the respective spring element landing surface 52.

Each spring element 32 may be constructed from flexible, resilient material such as, but not limited to, sheet metal.

Referring again to FIG. 1, the spring elements 32 are connected (e.g., attached or bonded) to the second body 24. The first bodies 22 are mated with the elastomeric body 28, where each first body 22 projects through a respective one of the apertures 50 (see FIGS. 4 and 5). In some embodiments, the apertures 50 may be sized such that an interference fit is provided between the elastomeric body 28 and the first bodies 22. In this manner, the first bodies 22 may be vertically as well as longitudinally and laterally (e.g., fixedly) attached to the elastomeric body 28.

The elastomeric body 28 and the frame 30 mated therewith are positioned between the spring elements 32. Each spring element 32A, 32B engages a respective one of the protrusions 36A, 36B (see FIG. 3) and, more particularly, a respective one of the spring element landing surfaces 52A, 52B. The spring elements 32, however, do not contact the frame 30. As a result, transmission of vibrations between the bodies 22 and 24 may be at least substantially limited and damped by the elastomeric body 28. Furthermore, the spring elements 32A and 32B may be operable to slide against the spring element landing surfaces 52A and 52B so as to accommodate vertical and/or longitudinal shifts between the bodies 22 and 24. Flexing of the spring elements 32 can also accommodate lateral shifts between the bodies 22 and 24.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A system comprising an assembly adapted to support a first body relative to a second body, the assembly comprising:
    an elastomeric body configured with a mounting aperture for receiving the first body, the elastomeric body comprising a first protrusion and a second protrusion;
    a frame wrapped about a perimeter of the elastomeric body, the frame configured with a first window and a second window, the first protrusion extending through the first window to a distal end of the first protrusion, and the second protrusion extending through the second window to a distal end of the second protrusion; and
    first and second spring elements adapted to mount to the second body;
    the elastomeric body disposed between the first and the second spring elements such that the first spring element engages the distal end of the first protrusion and the second spring element engages the distal end of the second protrusion.

2. The system of claim 1, wherein the elastomeric body is configured as an elastomeric block.

3. The system of claim 1, wherein
    the assembly is adapted to support a third body relative to the second body; and
    the elastomeric body is configured with a second mounting aperture for receiving the third body.

4. The system of claim 1, wherein the frame comprises metal.

5. The system of claim 1, wherein the frame does not contact the first spring element nor the second spring element.

6. The system of claim 1, wherein the first protrusion is adapted to slide against the first spring element, and the second protrusion is adapted to slide against the second spring element.

7. The system of claim 1, wherein the first and the second spring elements each comprise a cantilevered leaf spring.

8. The system of claim 1, wherein the first and the second spring elements each comprise metal.

9. The system of claim 1, further comprising the first body and the second body.

10. The system of claim 9, wherein the first body and the second body are each configured as components of an aircraft system.

11. The system of claim 9, wherein the first body comprises a utility line, and the second body comprises a nacelle structure.

12. An aircraft system, comprising:
    a first body of the aircraft system;
    a second body of the aircraft system; and
    an assembly that flexibly supports the first body relative to the second body, the assembly comprising an elastomeric body and a plurality of cantilevered leaf springs;
    each of the cantilevered leaf springs attached to the second body; and
    the elastomeric body disposed between the cantilevered leaf springs such that each of the cantilevered leaf springs slidably contacts the elastomeric body;
    wherein the first body is attached to the elastomeric body.

13. The aircraft system of claim 12, wherein the first body projects through the elastomeric body.

14. The aircraft system of claim 12, further comprising:
    a frame configured with a first window and a second window;
    a first portion of the elastomeric body projecting through the first window to a first surface of the elastomeric body;
    a second portion of the elastomeric body projecting through the second window to a second surface of the elastomeric body;
    a first of the cantilevered leaf springs slidably contacting the first surface; and
    a second of the cantilevered leaf springs slidably contacting the second surface.

15. The aircraft system of claim 12, wherein the first body comprises a utility line, and the second body comprises a housing.

16. A system, comprising:
    an assembly configured to flexibly support a first body relative to a second body, the assembly comprising an elastomeric body, a frame and a plurality of cantilevered leaf springs;
    the elastomeric body configured with a mounting aperture for receiving the first body, the elastomeric body comprising a first surface and a second surface;
    the frame attached to and supporting the elastomeric body;
    each of the cantilevered leaf springs configured to attach to the second body; and
    the elastomeric body disposed between the cantilevered leaf springs such that a first of the cantilevered leaf springs slidably contacts the first surface and a second of the cantilevered leaf springs slidably contacts the second surface;
    wherein the frame does not contact the cantilevered leaf springs.

17. The system of claim 16, wherein the frame wraps about a perimeter of the elastomeric body.

18. The system of claim 16, wherein
    the elastomeric body comprises a first protrusion and a second protrusion;
    the frame is configured with a first window and a second window;
    the first protrusion extends through the first window to the first surface; and the second protrusion extends through the second window to the second surface.

19. The system of claim 16, wherein the mounting aperture extends through the elastomeric body.

* * * * *